2,748,008
Patented May 29, 1956

2,748,008

METHOD OF MAKING POROUS CALCIUM SILICATE PRODUCTS

George L. Kalousek, Toledo, Ohio, assignor to Owens-Illinois Glass Company, a corporation of Ohio No Drawing. Application April 3, 1952,
Serial No. 280,397

9 Claims. (Cl. 106—120)

In the production of various types of products in the lime-silica-water system, many attempts have been made to produce integrated products of light apparent density and some measure of success has been attained but in many instances, either the particular process followed or the particular materials utilized, or both, limited the degree of ultimate success.

In the manufacture of such integrated products within this system, the art, both patent and industrial, has had recourse to various methods of retarding the settling of solids in their liquid carriers, such as the use of bentonite gels, cooking, use of starch, etc. None of these, however, provide a permanent suspension, i. e., they retard the rate of settling of the solids but never provide a slurry having a stable suspension of the solids in a liquid carrier wherein the characteristics thereof carry over into the final integrated product. It will be found in these products, that density varies thru the thickness of the product thus presenting a product of nonuniform density.

The use of either bentonite or powdered aluminum permits the production of comparatively light density products but the use of these materials as retardation or levitating agents for the solids in the slurries contributes detrimental factors that result in a limitation of the ultimate use of the products.

A new theory of suspension, as distinguished from retardation, has been described in the recent Fraser Patent 2,469,379 wherein highly spiculated asbestos fibers provide a system of suspension for the solids in a liquid carrier, which suspension is permanent to the extent that the original dispersion, suspension and the suspension agent retain their respective suspended position in the final product. However, this agent, namely, finely micronized asbestos fiber is non-reactive and retains its identity thereby presenting, for some purposes, an unsightly product and a product incapable of accepting a smooth surface finish.

There are at least two distinct differences between the old retardation methods and that of the Fraser patent, supra, namely, in the old methods the agents of retardation are converted and are only present in the ultimate product in their converted form whereas in Fraser, the agent is not converted but retains its original identity and remains imbedded in the end product in its original position.

All of these above discussed methods of retardation and suspension present in the end product some detrimental characteristic, for example, bentonite when used in quantities sufficient to provide a degree of retardation capable of producing a light density product, produces a very much weakened product of nonuniform density, while the above mentioned suspension of Fraser, although capable of producing a product of extremely light and uniform density with high modulus of rupture, also produces a product wherein the exterior surfaces are fuzzy and incapable of receiving or accepting a completely smooth surface finish.

In the present invention, the primary object is to produce a product of extremely light uniform density, high modulus of rupture and having the capacity to accept a high surface finish.

A further object is the production of an integrated product in the light apparent density range in which suspension in water of the solids, namely, lime and silica is necessary and wherein the suspension agent is a crystalline compound that loses its specific or individual identity in the end product.

Other objects will be apparent from the following specification.

To obtain the product of the present invention, it is necessary to have as the agent of suspension a crystalline compound in discrete particle or crystal form, each crystal having specific surface areas capable of rendering a high degree of dispersion and stable suspension of the solids in a liquid medium.

A further distinctive feature in the production of this type product is that the agent of suspension becomes an integral part of the finally integrated product and loses its specific individual identity.

Although the preferred utilization of this present invention is the formation of a permanent suspension for making integrated products, it is not beyond the purview of the invention to use these crystalline compounds for obtaining suspensions of various other solids in liquid mediums of various types and in particular, where it is requisite that the agent of suspension should lose its specific apparent identity in the end product.

Further, it is the purpose to provide not only a stable permanent suspension of the solids in a liquid carrier but to obtain such suspension with an agent the dimensions of which are of colloidal or nearly colloidal order and which will lose its specific and individual apparent identity in the finished product and permit the final product to accept a smooth surface finish.

Such an agent may be the product in discrete particle form obtained in accordance with the invention of the co-pending application Serial No. 12,692, filed March, 1948, now abandoned owned by a common assignee and which is directed to the manufacture of Lepisil, $4CaO.5SiO_2.5H_2O$, in discrete particle form.

Lepisil in discrete particle form, is an extremely thin scale or plate-like shape having specific surface areas ranging approximately from 48 to 55 square meters per gram of weight.

Other similar agents, such as synthetic xonotlite, $5CaO.5SiO_2.H_2O$ in discrete particle form, because of its lath-like form and also its high specific surface areas, approximately 45 to 54 square meters per gram of weight, may also be used as a suspension agent and there may be other silicate compounds or structures having the necessary attributes for this purpose but as the specific example in this present specification, xonotlite shall be referred to as the agent for suspension.

Suspension of the finely divided lime and silica solids as contemplated in this invention is only necessary in the light density field, i. e., wherein the apparent density ranges from the lightest up to approximately 40 p. c. f. or wherein the ratio of liquids to total solids is greater than 1:1 by volume.

In order to produce a particular lime-silica integrated product, for example, xonotlite ($5CaO.5SiO_2.H_2O$) in accordance with this invention, a specific molecular ratio of lime to silica must be present in the slurry, which in this instance, is 1:1.

These lath-like silicate crystals of synthetic xonotlite, which provide this basis for suspension of the solids in a liquid, each contain lime and silica in a molar ratio of 1:0 and thus provide in the slurry a predetermined weight of these two reactive components. The added lime and silica either in free or combined form must be added in such proportions that the proper balance of the reactive materials in the formulation will obtain and provide thereby a slurry capable of conversion to end products having a molar ratio of lime to silica of about 1:1 in the integrated end product.

The conditions set forth above are also true with respect to producing Lepisil in integrated form (4CaO.5SiO₂.5H₂O)

except that the molecular ratio will be 0.8:1 in the end product, thus requiring a different and specific regulation of the added lime and silica components.

In the light apparent density range of products herein contemplated, it will be found necessary to add to a mixture of lime, silica and water an amount of synthetic xonotlite in reacted discrete particle form, sufficient to support the solids or the granular components in a fine dispersion and suspension in the liquid medium, from the time of completion of the mixing operation until sufficient reaction has occurred to thereafter retain the components in their originally dispersed and suspended relationship.

These reacted xonotlite crystals in discrete particle form have dimensions of colloidal order, specific surface areas ranging from 45 to 55 square meters per gram and must be present in volume sufficient to promote free and uniform dispersion throughout a volume of liquid upon being mixed therewith in dilute proportions (e. g. not in excess of 8:1 by weight). They will acquire and maintain a random and spaced apart arrangement throughout the fluid mixture with the resultant effect of random dispersion of the lime-silica solids and will induce incipient crystal formation at and from such spaced apart points as well as from the dispersed solids under reaction temperature and pressure and form with the converted solids an integrated porous structure. These added previously reacted synthetic crystalline compounds, because of their scale or lath-like shape, nearly colloidal dimensions and high specific surface areas, will form an interlaced and interlocked haystack lattice system, capable of supporting the finely divided solids of the mixture in the liquid medium and in this open, three-dimensional network or lattice system the reactive materials, such as finely divided free lime and silica, or lime and silica in other forms, are capable of dispersion without destroying either the lattice system or the suspension provided by these pre-formed hydrous calcium silicate crystals.

Thus, in the production of a particular integrated product, such as, synthetic xonotlite in integrated form, there is provided an aqueous slurry composed of added unreacted lime and unreacted silica, added reacted synthetic hydrous calcium silicate crystals containing lime and silica in a molar ratio of 1:1 and added hot water (150-175° F.); the added lime and silica being mixed together with the added reacted synthetic crystals and dispersed and suspended in and upon the lattice system formed by the added reacted synthetic crystals and with a ratio of water to total solids greater than 1:1 and wherein the total CaO and SiO₂ of the added solids and that of the crystals is in a molar ratio of 1:0.

After complete mixing of the above subject slurry, it is poured into molds or otherwise shaped and subsequently subjected to reaction temperatures and/or pressures for a period of time sufficient to react all of the component materials, including the silicate crystals into an integrated or combined form, and then dried.

In this particular instance, where the molar ratio of the total lime to total silica is approximately 1:0, the molded slurry is subjected to a predetermined indurating temperature and pressure in excess of 175° C. and 130 p. s. i. abs., in an autoclave for a period of time varying downwardly from approximately 15 hours depending upon the pressure being utilized.

In this lime-silica system it is necessary, in order to produce a given end product, to start with a specific slurry formulated with the lime and silica in a specific molar ratio and to subject each such slurry to a preferred time and temperature and/or its equivalent pressure. For example:

1. Xonotlite (crystalline compound)

Molar ratio _____ 1:1.
Temperature _____ approximately 200° C.
Pressure _____ 225# p. s. i. abs.
Time _____ 8 hours.

2. Lepisil (crystalline compound)

Molar ratio _____ .8/.825:1.
Temperature _____ approximately 175° C.
Pressure _____ 130# abs.
Time _____ 8 hours.

3. (Fibrous crystal structures)

Molar ratio _____ .65/.780:1.
Temperature _____ 180° C.
Pressure _____ 150# p. s. i. abs.
Time _____ 12 hours.

As a further example of the utilization of this invention, reference is made to the use of compositions which may be prepared in accordance with the procedure of the invention as follows, if the suspension agent is the crystalline compound lepisil containing lime and silica in a molar ratio of 0.8:1, to produce either a pure compound or a combination of the particular compound and another hydrous calcium silicate.

1. 21 p. c. f.—W/S ratio=3/1

| | Pounds |
|---|---|
| Suspension agent (lepisil) | 350 |
| C/S ratio 0.65:1: | |
| Lime | 1066 |
| Silica | 1760 |
| Water | 9500 |

2. 11 p. c. f.—W/S ratio=6/1

| | Pounds |
|---|---|
| Suspension agent (lepisil) | 285 |
| C/S ratio 0.8:1: | |
| Lime | 355 |
| Silica | 98 |
| Diatomaceous earth | 378 |
| Water | 6700 |

If the suspension agent is the crystalline compound xonotlite having lime and silica in the molar ratio of 1:1 the following composition will produce a pure crystalline product having the molar ratio of lime to silica of 1:1 therein.

3. 7 p. c. f.—W/S ratio=8/1

| | Pounds |
|---|---|
| Suspension agent (xonotlite) | 1600 |
| C/S ratio 1.0:1.0: | |
| Lime | 2330 |
| Silica | 2500 |
| Water | 51400 |

Other formulations having various lime to silica ratios of at least 0.65:1 to about 1:1 may be utilized in various water to solids ratios to produce products having densities ranging from the lightest p. c. f. in integrated form up to the point where the water to solids ratio is such as to obviate the need of any suspension of the reactive solids. The quantity of the particular reacted crystalline form of suspension agent required will vary with the desired density of the end product and in the entire range of products will be in a range of from approximately 5% to approximately 30% of the total solids of the slurry by weight, i. e., the solids including the lime, silica and the suspension agent. Such products may be made as pure crystalline compounds, a combination of compounds, a combination of a compound or compounds and fibrous crystal structures.

Because of the excellent suspension characteristics of these crystalline suspending agents, the slurry after being poured into the molds will be found not to de-water upon standing, regardless of the period elapsing between pouring and curing or indurating.

In this same slurry, these crystalline suspension agents will be found to have assumed a certain random pattern and position both with respect to each other and to the lime-silica solids dispersed therethrough and suspended therein, providing thereby a uniform dispersion and suspension of these solids through the dimensions of the mold. And this dispersion and suspension remains static and permanent through the curing period, resulting in a porous product in which both the suspension agents and the solids have reacted and combined with each other at and in their respective positions to become a single integral part and with the loss of the specific and individual identity of the suspension agent so far as the human eye is concerned.

This loss of specific and individual identity of the crystals during induration of the slurry is based upon the fact that the crystals, per se, will enter into reaction and after completion of the reaction of the mass it will be difficult to distinguish the added reacted and preformed crystals or suspension crystals from the newly formed crystals with which they are integrated throughout the mass.

Thus, if the finely divided reactive silica and dispersed or dissolved lime, as lime in water, are dispersed through a large volume of water, and the particles (or solution) retained in such a wide state of dispersion with and by the preformed reacted lath-like or platy crystalline compounds or crystals, and the reaction therebetween to hydrous calcium silicate is effected, other platy or lath-like crystals of hydrous calcium silicate will be induced or compelled to grow and combine with the preformed crystals and present a dispersed, entangled mass of crystals throughout the entire volume into which the reactive agents (and such points of inception) have been held suspended during reaction. Moreover, the segregated forming or growing crystals will, in the course of their growth, unite at points of contact between two or more growing crystals and with the preformed suspension crystals and thus all these crystals will become intertwined to form an interknit, open lattice of permanent arrangement and integrated structure following the pattern set therefor by the original suspension of the preformed crystals and solids in the slurry.

Thus the preformed crystals and the solids are continuously maintained in their original spaced relationships through the conversion period and continue to occupy the same volume and shape, in this integrated lattice system which they formed in the water dispersion alone.

Upon completion of the crystal growing phase and subsequent removal of the uncombined water, the integrated mass will present innumerable voids and air spaces which will be found to be continuous and capillary in character and intercommunicating, the result of which will be a product of continuous, filamentary, microscopically fine crystal formation having intervening small attenuated capillary air spaces between and separating them and with said spaces greater in volume than the solids.

Such a structure presents a product of low thermal conductivity and conversely of high insulating value and possessed of high form-retaining value and tensile strength and very low apparent density.

The essence of this invention resides in the formation of a liquid slurry of reactive solids, held in suspension in the liquid by a suspension agent of the similar chemical identity as the solids, wherein the water-solids ratio is greater than 1:1, reacting the slurry by heat and/or pressure to form an integrated product wherein the suspension agent will integrate with the reactive solids to become an integral part thereof but with retention of the respective relationships of the agent and solids but with the loss of the specific individual identity of the suspension agent and removing the uncombined water therefrom leaving an integrated dry product having an apparent density inversely proportional to the water to solids ratio of the original slurry.

From the preceding descriptive matter it should be apparent that xonotlite, lepisil or other crystalline compounds or crystal structures having the characteristics and capacities to form a stable permanent suspension of solids in a liquid may be utilized in carrying out the present invention and it should be further apparent that these suspension agents not only lose their specific and individual identities but they also integrate with the reactive solids to become an integral part of the end product without any deleterious effects thereto.

Further, it should also be apparent that there is a very distinctive difference between this invention and the prior art in that the suspension agent becomes an integral part of the end product without any chemical disassociation between it and the integrated mass as a whole, without leaving any foreign agent or converted product therein, embedded or otherwise and differing from the integrated end product and that would have a deleterious effect upon the various characteristics or properties of the said integrated mass or product.

The terms, lath, lath-like, scale, platy or plate as used herein are synonymous and contemplate any crystalline compound formed from reactive lime and silica that has the necessary characteristics to carry out the invention set forth herein and in fields other than the lime-silica field.

Modifications may be resorted to within the spirit and scope of the appended claims.

I claim:

1. The method of making light apparent density products from stable suspensions of finely divided reactive solids, comprising forming an aqueous slurry having dispersed therein reacted hydrous calcium silicate crystals of lath-like shape and nearly colloidal dimensions and in discrete particle form, said crystals having surface areas of approximately 45 to 55 square meters per gram of weight, said crystals being selected from the group consisting of crystals having a chemical composition $5CaO.5SiO_2.H_2O$ and $4CaO.5SiO_2.5H_2O$, and finely divided reactive solids in the form of lime and silica, the molar ratio of lime to silica being at least 0.65:1 to about 1:1, mixing said slurry to uniformly disperse both the discrete particles and the solids through the liquid to thereby from a stable suspension thereof, the liquid to solids ratio being greater than 1:1, and reacting the reactive solids of said slurry while in suspension by subjecting same to a temperature and pressure in excess of respectively 175° C. and 130 p. s. i. abs.

2. The method of making light apparent density products from stable suspensions of finely divided reactive solids, comprising forming an aqueous slurry having dispersed therein reacted hydrous calcium silicate crystals in discrete particle form, and finely divided reactive solids in the form of lime and silica, said discrete particles being crystals of lath-like shape, of nearly colloidal dimensions and having the chemical composition $5CaO.5SiO_2.H_2O$, said crystals having surface areas of approximately 45 to 54 square meters per gram of weight, mixing said slurry to uniformly disperse both the discrete particles and the solids through the liquid to thereby form a stable suspension thereof, the liquid to solids ratio being in excess of 1:1 by volume and reacting the reactive solids of the said slurry while in suspension by subjecting same to a temperature and pressure in excess of respectively 175° C. and 130 p. s. i. abs.

3. The method of making light apparent density products from stable suspensions of finely divided reactive solids, comprising forming an aqueous slurry having dispersed therein reacted hydrous calcium silicate crystals in discrete particle form, and finely divided reactive solids in the form of lime and silica, said discrete particles being crystals of scale-like shape, of nearly colloidal dimensions and having the chemical composition 4CaO.5SiO$_2$.5H$_2$O, said crystals having surface areas of approximately 48 to 55 square meters per gram of weight, mixing said slurry to uniformly disperse both the discrete particles and the solids through the liquid to thereby form a stable suspension thereof, the liquid to solids ratio being in excess of 1:1 by volume and reacting the reactive solids of the said slurry while in suspension by subjecting same to a temperature and pressure in excess of respectively 175° C. and 130 p. s. i. abs.

4. The method of making light apparent density products in integrated form from stable suspensions of finely divided reactive solids, comprising forming an aqueous slurry having dispersed therein hydrous calcium silicate crystals in discrete particle form, and finely divided reactive solids, said discrete particles being reacted crystals of lath and scale-like shape, of nearly colloidal dimensions and having a chemical composition wherein the more ratio of lime to silica is 1:0 or less, said crystals having surface areas of approximately 45 to 55 square meters per gram of weight, said crystals being selected from the group consisting of crystals having a chemical composition 5CaO.5SiO$_2$.H$_2$O and 4CaO.5SiO$_2$.5H$_2$O, said solids being finely divided reactive lime and silica and being present in a slurry in a molar ratio within the molar range of at least 0.65:1 to about 1:1, mixing said slurry to uniformly disperse both the discrete particles and the solids through the liquid to thereby form a stable suspension thereof, the liquid to solids ratio being in excess of 1:1 by volume and reacting the reactive components of the said slurry while in suspension by subjecting same to a temperature and pressure in excess of respectively 175° C. and 130 p. s. i. abs.

5. The product prepared in accordance with the method set forth in claim 1.

6. The method of making light apparent density products from stable suspensions of finely divided reactive solids, which method comprises forming an aqueous slurry having dispersed therein reacted hydrous calcium silicate crystals in discrete particle form, and finely divided reactive solids of lime and silica, said discrete particles being of lath-like shape and having colloidal dimensions and the chemical composition 5CaO.5SiO$_2$.H$_2$O, said particles having surface areas of approximately 45 to 54 square meters per gram of weight, the molar ratio of lime to silica being 1:1, mixing said slurry to uniformly disperse both the discrete particles and the solids through the liquid to thereby form a stable suspension thereof, the liquid to solids ratio being in excess of 1:1 by volume, and reacting the reactive solids of said slurry by subjecting same to a temperature and pressure in excess of 175° C. and 130 p. s. i. abs., respectively.

7. The product prepared in accordance with the method set forth in claim 6, said discrete particles of reacted hydrous calcium silicate being unidentifiable in said product.

8. The method of making light apparent density products from stable suspensions of finely divided reactive solids, which method comprises forming an aqueous slurry having dispersed therein reacted hydrous calcium silicate crystals in discrete particle form, and finely divided reactive solids of lime and silica, said discrete particles being of lath-like shape and having colloidal dimensions and the chemical composition 4CaO.5SiO$_2$.5H$_2$O, said particles having surface areas of approximately 48 to 15 square meters per gram of weight, the molar ratio of lime to silica being 0.8:1, mixing said slurry to uniformly disperse both the discrete particles and the solids through the liquid to thereby form a stable suspension thereof, the liquid to solids ratio being in excess of 1:1 by volume, and reacting the reactive solids of said slurry by subjecting same to a temperature and pressure in excess of 175° C. and 130 p. s. i. abs., respectively.

9. The product prepared in accordance with the method set forth in claim 8, said discrete particles of reacted hydrous calcium silicate being unidentifiable in said product.

References Cited in the file of this patent

UNITED STATES PATENTS

| Re. 23,228 | Fraser | May 9, 1950 |
| 2,215,891 | Thomson et al. | Sept. 24, 1940 |
| 2,540,354 | Selden | Feb. 6, 1951 |
| 2,547,127 | Kalousek | Apr. 3, 1951 |